United States Patent
Xie

(10) Patent No.: US 7,304,937 B1
(45) Date of Patent: Dec. 4, 2007

(54) IDENTIFICATION OF PROGRAM INFORMATION ON A RECORDING MEDIUM

(75) Inventor: Jianlei Xie, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/445,131

(22) PCT Filed: Jun. 16, 1998

(86) PCT No.: PCT/US98/12502

§ 371 (c)(1),
(2), (4) Date: Mar. 8, 2000

(87) PCT Pub. No.: WO98/58368

PCT Pub. Date: Dec. 23, 1998

(51) Int. Cl.
*G11B 7/00* (2006.01)

(52) U.S. Cl. .............................. 369/272.1; 369/52.1

(58) Field of Classification Search ............ 369/275.1, 369/94, 53.31, 53.2, 59.25, 30.04, 30.07, 369/53.21, 53.22, 52.1, 53.37; 386/94, 125, 386/126
See application file for complete search history.

(56) References Cited

U.S. PATENT DOCUMENTS

| | | | | |
|---|---|---|---|---|
| 4,229,808 A | * | 10/1980 | Hui | 369/53.14 |
| 4,450,553 A | * | 5/1984 | Holster et al. | 369/275.5 |
| 4,961,077 A | | 10/1990 | Wilson et al. | 346/1.1 |
| 5,218,599 A | * | 6/1993 | Tsuyoshi et al. | 369/275.4 |
| 5,400,319 A | | 3/1995 | Fite et al. | 369/275.5 |
| 5,513,169 A | | 4/1996 | Fite et al. | 369/272 |
| 5,541,904 A | | 7/1996 | Fite et al. | 369/58 |
| 5,754,649 A | * | 5/1998 | Ryan et al. | 380/203 |
| 5,759,332 A | * | 6/1998 | Itoigawa et al. | 156/273.5 |
| 5,761,301 A | * | 6/1998 | Oshima et al. | 705/57 |
| 5,764,620 A | * | 6/1998 | Satoh et al. | 369/275.1 |
| 5,768,252 A | * | 6/1998 | Yokota | 369/195 |

(Continued)

FOREIGN PATENT DOCUMENTS

DE  A-440371  8/1995

(Continued)

OTHER PUBLICATIONS

Japanese Patent Abstract—JP 9073634 A.

(Continued)

*Primary Examiner*—William R. Korzuch
*Assistant Examiner*—Joseph Haley
(74) *Attorney, Agent, or Firm*—Joseph J. Laks; Robert D. Shedd; Catherine A. Ferguson

(57) ABSTRACT

A system and method of identifying programs contained on a disk of any format, including, for example, either a single-sided or a double-sided disk with either a single-layer or multi-layer tracks, are presented. In particular, a dual-sided recording medium is disclosed having respective program data on the first and the second sides of said medium. In addition, the medium has a first area on the first side and a second area on the second side, and the areas have laser encoded data representing individualized information relating to said respective program data. The areas may or may not overlap each other depending on the configuration chosen. Also disclosed is an apparatus for laser encoding the above-described recording medium, and a method for processing a disk having more than one laser encoded areas.

15 Claims, 11 Drawing Sheets

U.S. PATENT DOCUMENTS

| | | | | |
|---|---|---|---|---|
| 5,805,563 | A | * | 9/1998 | Nakano .................... 369/275.1 |
| 6,034,934 | A | * | 3/2000 | Miyake et al. ........... 369/53.28 |
| 6,052,465 | A | * | 4/2000 | Gotoh et al. ............. 369/53.21 |
| 6,081,785 | A | * | 6/2000 | Oshima et al. ............. 369/272 |
| 6,097,814 | A | * | 8/2000 | Mochizuki ................... 380/44 |
| 6,408,285 | B1 | * | 6/2002 | Oshima et al. ............... 705/57 |

FOREIGN PATENT DOCUMENTS

| | | |
|---|---|---|
| EP | 0329122 | 8/1989 |
| EP | 0802527 | 10/1997 |
| EP | 0807929 A1 | 11/1997 |
| JP | 3-78178 | 4/1991 |
| JP | HEI 3-78178 | 4/1991 |
| JP | 8-287522 | 11/1996 |
| WO | 97/14144 | 4/1997 |
| WO | WO97/14146 | 11/1997 |

OTHER PUBLICATIONS

Article by C-Cube Microsystems entitled "Digital Video Disc: The Coming Revolution in Consumer Electronics", 1997.

Article by Jim Shatz Akin entitled "What's Playing" Jul. 1997 MacUser, p. 77.

BCA (Burst Cutting Area) Recording Technology for adding individual information on DVD ROM disc by Matsushita Electric Industrial Co. of Japan; Translation from National Technical Report, vol. 43, No. 3, Jun. 1997, pp. 1-18.

* cited by examiner

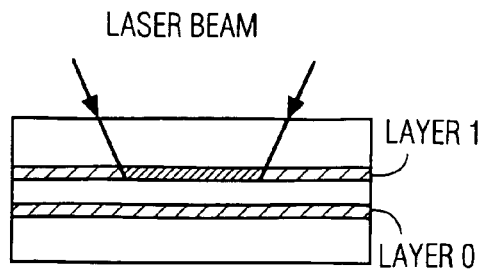
FIG. 3A1
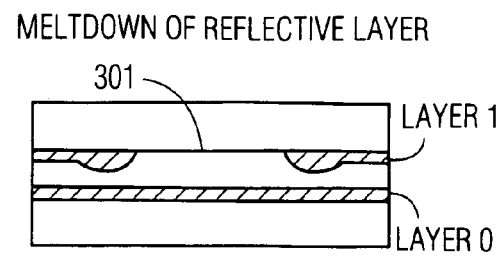
FIG. 3A2
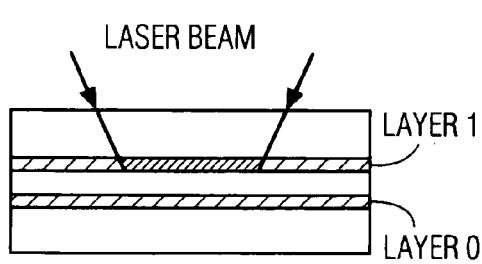
FIG. 3B1
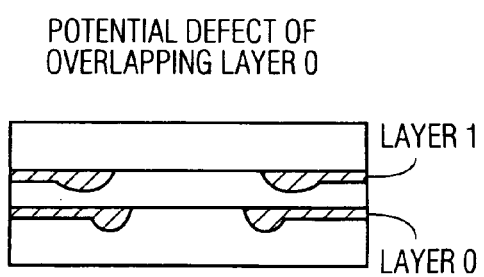
FIG. 3B2

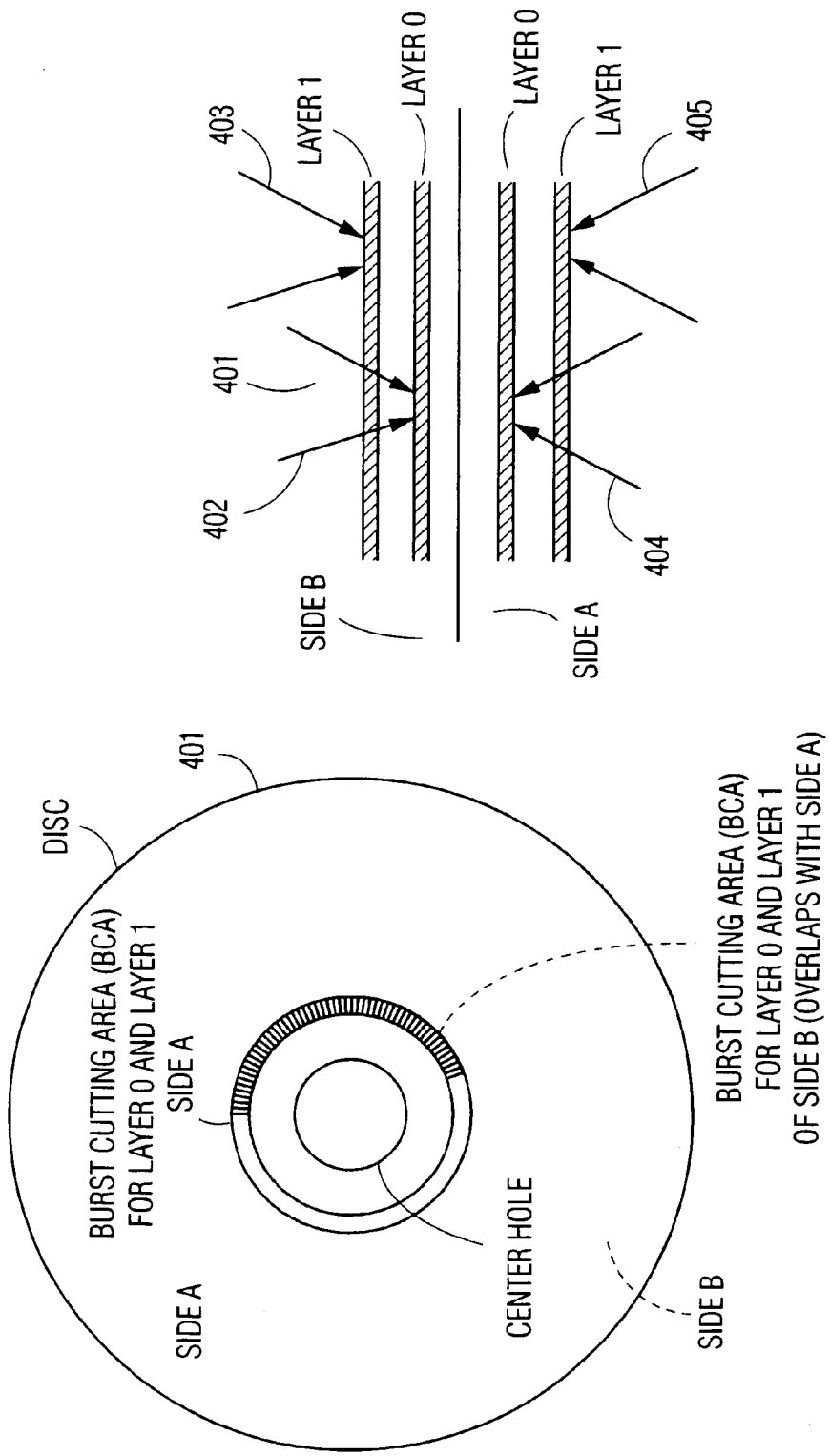

IDENTIFICATION OF PROGRAM INFORMATION ON A RECORDING MEDIUM

FIELD OF INVENTION

This invention generally relates to the field of encoding information on a recording medium, and more particularly to a system and method of identifying a disk with any format, including, for example, either a single-sided or a double-sided format with either a single-layer or multiple-layer tracks.

BACKGROUND OF INVENTION

Laser disks such as CD ROMs have become the preferred recording medium for audio music and/or computer program distribution. More recently, Digital Video/Versatile Disks (DVD) have been introduced that are predicted to become the preferred choice for recording everything from full-length motion pictures to computer games.

One advantage of a DVD over CD ROM is DVD's superior data storage capacity. The current industry-wide DVD Specifications for Read-Only Disk (published by and obtainable from Toshiba Corporation of Tokyo, Japan; here in after referred to as "DVD Specifications") support at least the following formats (listed with the corresponding storage capacities for a 12 cm DVD ROM disk):

| Format | Capacity |
| --- | --- |
| Single sided | 4.7 GBytes |
| Double sided | 9.4 GBytes |
| Single sided, dual layered | 8.54 GBytes |
| Double sided, dual layered | 17 Gbytes |

From the above, it is clear that the storage capacities of DVD disks improve dramatically over the storage capacity of 0.65 GByte available on the current CD-ROM. In addition, other optical disks with more than 4 layers of tracks are also being produced.

A laser or an optical disk such as a DVD disk is made up of a reflective metal foil layer such as aluminum encased in a clear substrate. Data are stored on the foil as a series of tiny pits formed in a continues tight spiral on the disk. The pits are formed in the foil by first stamping a disk made of polycarbonate, acrylic, polyolefine or similar material, using a master stamper in a pressing or injection molding process. The surface of the injection molded disk is then metalized with, for example, aluminum metal in a sputtering process to form the metal foil containing the pits. The pits provide the necessary reflective surface so that a laser beam from a DVD player may be reflected to indicate the data pattern on the disc.

As mention above, there are at least 4 different formats currently contemplated for DVD. In the case of a single-sided DVD, the stamped disk is joined to a dummy substrate. For a double-sided disk, two halves, each with a respective metal foil layer containing data, are bonded back to back.

In addition, as defined by the DVD Specifications, two layers of data are possible on each side of a disk. A single-layer disk has only one track per side on a disk, whereas a dual-layer disk has two tracks per side of a disk. A dual-layer disk has both a Layer 0 track closer to the reading surface, and a Layer 1 track, away from the reading surface, as shown, for example, in FIG. 1A. Typically, a dual-focus optical system is employed so that the data on either Layer 0 or Layer 1 on a dual-layer disk can be read. Layer 0 is purposely made partially transparent so that a laser in the optical system can focus on Layer 1 through Layer 0.

FIG. 1B shows the disk structure of a known double-sided, dual-layer disk. The exemplary disk has a total of 4 reflective layers (two on each side of the disk). To read a dual-sided disk, a user either manually flips over the disk or the DVD player use a motor mechanism to automatically flip the disk or the laser.

Since all the laser disks from a single manufacturing run are stamped from the same stamping master, their contents are identical to each other and to the stamping master. It has been recognized that it may be desirable to be able to put certain data (e.g., serial number or encryption key, etc.) unique to each disk or program on the disk so that the disk or the program contained within can be identified. This would allow, for example, a company to be able to offer pay-per-view capability, to prevent piracy, or to remotely activate a computer program.

For example, to offer a pay-per-view service using a DVD disk, a company may decide to give out DVD disks containing a movie program at very low cost and then to charge viewers based on the number of times the movie is played. This pay-per-view application can be accomplished, for example, by having an individualized serial number associated with each individual disk or program being distributed. A DVD player can be built that can interrogate and retrieve this serial number, if the disk is played by the player. This serial number can then be transmitted to the program provider's billing center via a built-in modem, for example, in the DVD player, so that a charge can be billed to the household where the DVD player resides.

In order to support this type of application, the current DVD Specifications define an area on a DVD disk that allows a manufacturer to etch, by a laser, information onto each disk during the post-stamping production. (See, for example, DVD Specifications for Read Only Disk/Part 1, Physical Specification Version 1.0, Annex K).

This "Burst Cutting Area" (BCA) is specified to be located between an inner circumference of 22.3 (+0/−0.4) mm to an outer circumference of 23.50 (+/−0.05) mm from the center of the center hole of a disk, as shown in FIG. 2. BCA is specified in the DVD Specifications only for a single-sided disk, either with single or dual layers. For a dual-layer disk, the DVD Specifications require that the BCA to be on layer 1 of the single-sided disk.

According to the information to be encoded, stripes in a bar-code like shape are formed by partially removing an aluminum reflective layer of a disk using a converged laser beam. When the stripped part of the BCA is reproduced with an optical laser, the amount of reflected light drops to near zero. When compared to normal program pit signal, the BCA signal level is larger in amplitude and longer in cycle. Therefore, the BCA signal is easily distinguished from a DVD program signal by passing the signal through a simple low-pass filter.

A maximum of 2000 stripes in bar code form may be recorded along the circumference of the disk. Maximum of 188 bytes are currently allowed in the BCA strip, which in the bar-code like encoding reaches a rotational angle of 300 degrees along the circumference of the disk, as shown in FIG. 2.

A laser system capable of encoding individualized information on a disk conforming to the BCA requirement of the DVD Specifications is described, for example, in an article entitled "BCA Recording Technology for Adding Individual Information on DVD ROM Disk", published in National Technical Report of Japan, Vol. 43, No. 3, dated June, 1997. The system employs a CW-Q switch type YGA laser with wavelength of 1.06 um to encode data in a BCA area.

Similarly, D1, EP 0 802 527 A1, discloses an optical disk having a first recording area and a BCA area encoded with identification data. The data in the BCA is used to decipher data recorded on the first encoding area. Nowhere in D1, however, suggests that the optical disk may have different sides or layers or that more than one BCA area may be used on the disk.

In summary, current DVD Specifications as well as the above mentioned article and D1, do not teach or suggest that multiple BCA areas may be included on a single disk, or that a BCA may be applied to a dual-sided disk, or that each layer or each side of a recording medium may have a unique BCA.

SUMMARY OF INVENTION

The present invention recognizes that it is desirable to be able to provide multiple laser-encoded areas on a single disk. In particular, it is desirable to provide a respective laser-encoded area having selectively distinctive information for each side and/or each layer of a recording medium such as a laser disk. This would greatly expand the capability of a program distributor to be able to uniquely identify the contents of a disk. This would allow, for example, a pay-per-view provider to be able to distribute different movies encoded on different layers and/or different sides of a disk, instead of being limited to having only one BCA for the whole entire disk, as specified in the current DVD Specifications. This would greatly reduce the cost of program distribution.

Another aspect of the present invention is the recognition by the present invention that the laser cutting process employed to remove the aluminum reflective surface to form a BCA may cause potential defects if more than one BCAs are used on a disk and the different BCAs overlap each other. This potential problem is illustrated in FIGS. 3A and 3B. FIG. 3A illustrates the process for removing a portion of reflective layer 1 for encoding individualizable information in a BCA. This is done, for example, by focusing a YGA laser on the reflective layer 1 of the disk, as shown in FIG. 3A. The portion of the reflective layer 1 is then melted, and the melted aluminum is then pulled away by surface tension leaving a non-metal portion 301, as shown in FIG. 3A.

FIG. 3B illustrates that when there is a problem with the laser cutting process, some portion of the laser energy may be absorbed unintentionally by another overlapping metal layer, for example, layer 0 of the recording medium, appearing below layer 1. This may cause the data of the BCA contained in the overlapping layer 0 of the disk to be corrupted. A defect of this kind will render the associated user program on layer 0 of the disk useless.

Therefore, a recording medium according to the present invention is disclosed, having a first and a second side comprising:
respective program data on said first and said second sides of said medium; and
a first area on said first side and a second area on said second side of said medium, said areas having laser encoded data representing individualizable information relating to said respective program data.

In one aspect of the present invention, the first and the second area described above do not overlap each other.

In addition, an apparatus for encoding a first and a second selectively distinctive codes on a recording medium is disclosed, comprising:
means for encoding said first code in a first preselected position and in a first preselected layer on a first side of said recording medium;
means for turning said recording medium to a second side; and
means for encoding said second code in a second preselected position and in a second preselected layer on said second side of said recording medium.

BRIEF DESCRIPTION OF DRAWINGS

FIG. 3A shows how a portion of a metal layer is removed to form a burst cutting area.

FIG. 3B shows how damage may occur to another overlapping burst cutting area.

FIGS. 4A and 4B show an exemplary disk which has an overlapping burst cutting area for each layer of the disk in accordance with the present invention.

DETAILED DESCRIPTION OF DRAWING

Figure 2:
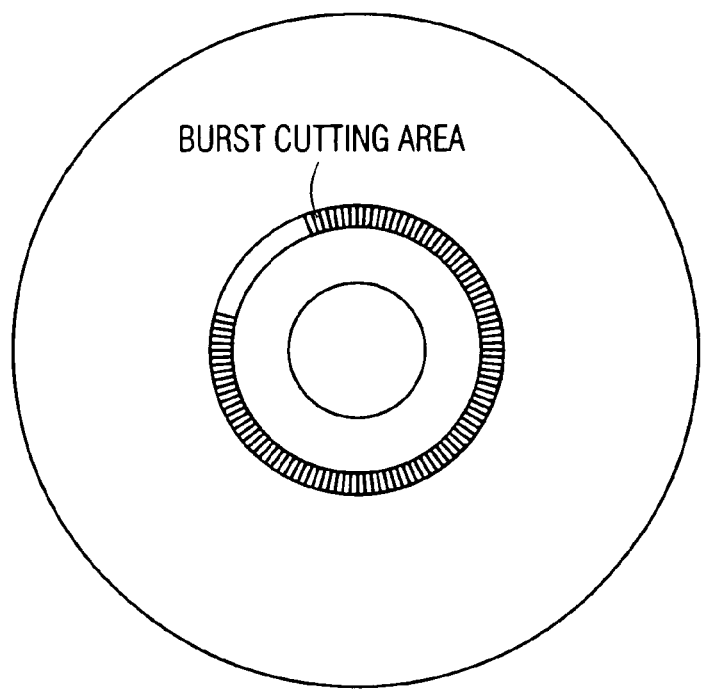
FIG. 2 shows an illustration of a burst cutting or laser cutting area on a disk.

FIG. 4A shows an exemplary, double-sided, dual-layer disk 401 which has a burst cutting area for each layer of the disk in accordance with the present invention. Each respective BCA area for each layer of the disk may, for example, occupy the same location as currently specified in the DVD Specifications (i.e., with inner circumference of 22.3 (+0/−0.4) mm and outer circumference of 23.50 (+/−0.05) mm, from the center of the center hole), as shown in FIGS. 2 and 4A. The advantage of having the respective BCA for each layer at the same location as currently specified in the DVD Specifications is that no hardware modification is needed for the present DVD player to be able to read the individualized code encoded in the respective BCA area.

Figure 1A:
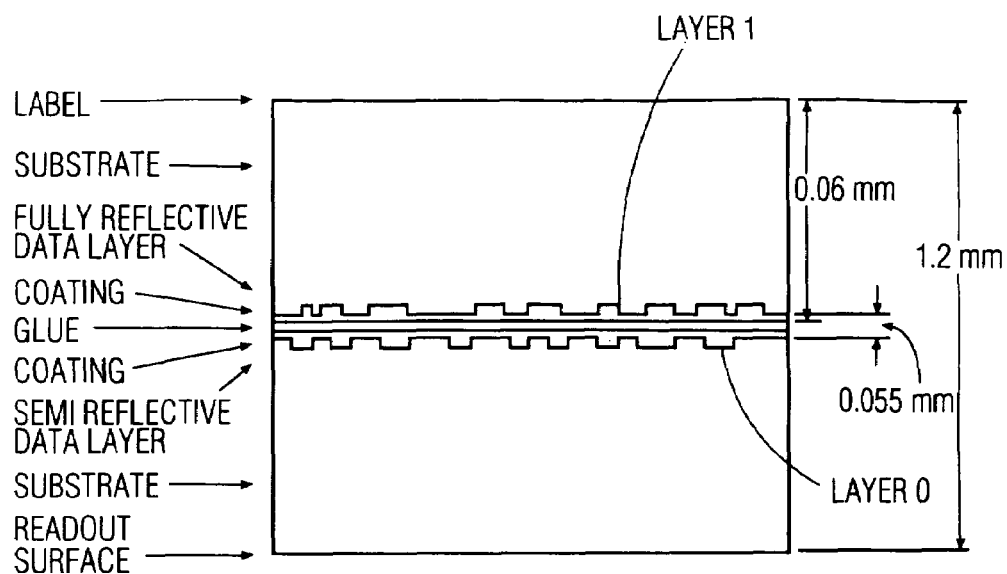
FIG. 1A shows an exemplary structure of a dual-layer DVD disk.
Figure 1B:
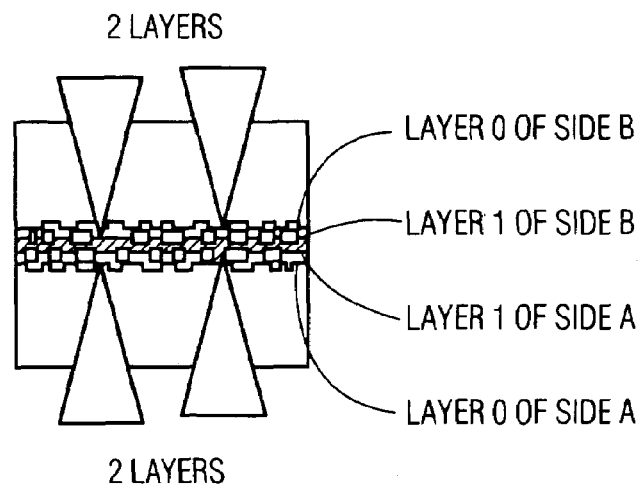
FIG. 1B shows an exemplary structure of a dual-layer, dual-sided DVD disk.

As shown in FIG. 4B, the BCA for layer 0 of side A of the disk 401 will be encoded in layer 0 of side A. The BCA for layer 1 of side A will be encoded in layer 1 of side A of the disk 401. Similarly, BCA for layer 0 of side B will be encoded in layer 0 of side B of the disk 401, and BCA for layer 1 of side B will be encoded in layer 1 of side B of the disk 401. FIG. 4B also illustrates how a YGA laser may be positioned and focused (see, for example, positions (402–405) to encode the individualized codes for each BCA for each layer of the disk 401. The YGA laser may be focused on layer 0 of disk 401 through layer 1 since layer 1 is semi-reflective as discussed above and shown in FIG. 1A.

Figure 5:
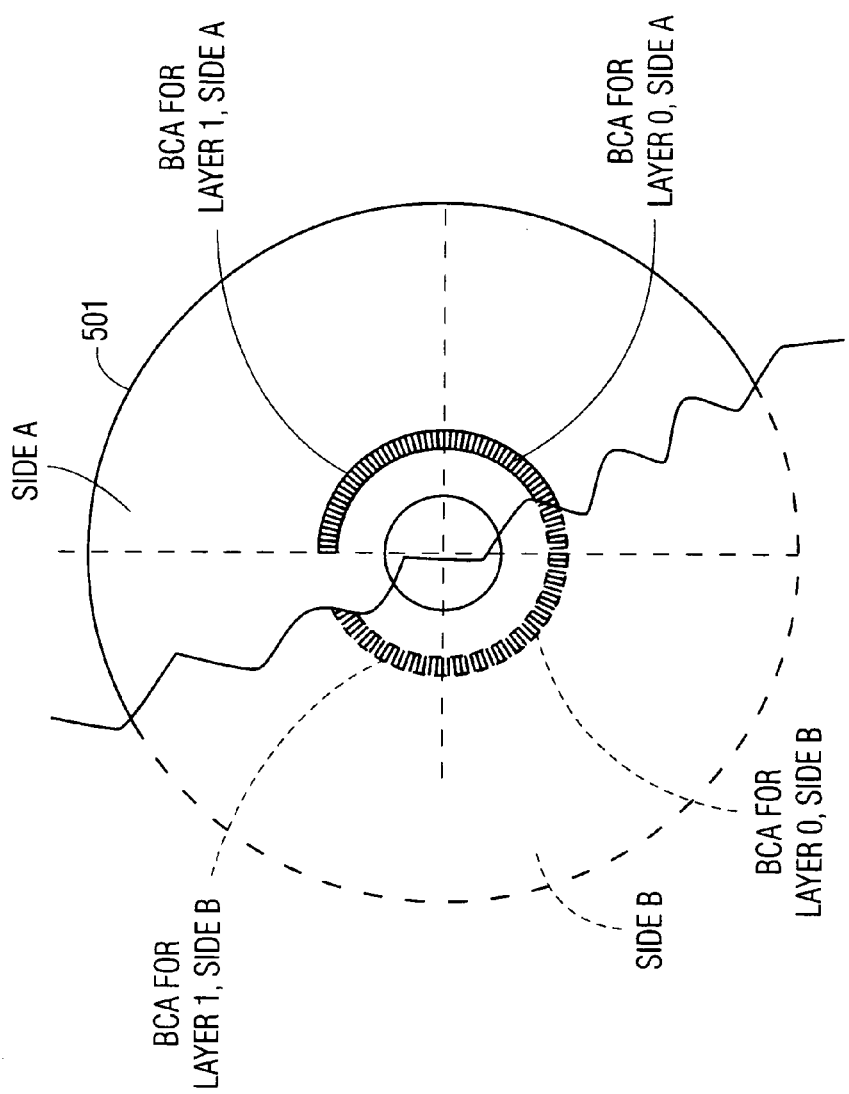
FIG. 5 shows an exemplary disk which has a burst cutting area for each layer of a dual-sided, dual-layer disk, with each burst cutting area occupying a separate non-overlapping area of the disk, in accordance with the present invention.

As discussed above, the present invention recognizes that it may be desirable to locate a respective BCA for each layer of a recording medium in a non-overlapping manner with respect to each other so that potential defects may be minimized. FIG. 5 shows one such exemplary configuration in accordance with the present invention.

FIG. 5 shows a double-sided, dual-layer disk which also has a BCA for each layer of the disk. Each respective BCA may be positioned, for example, as specified in the DVD Specifications (i.e., located with inner circumference of 22.3 (+0/−0.4) mm and outer circumference of 23.50 (+/−0.05) mm from the center of the center hole). However, in order for all four BCAs to be non-overlapping with respect to each other, each BCA is allocated to have approximately ¼ circumference of the specified BCA area, as shown in FIG. 5. Of course, the allocation of one quadrant for each BCA of each layer is exemplary only. The allocation may be done dynamically, for example, depending on the amount of individualized information needed to be encoded for each layer of the disk and the actual number of BCA areas used. Again, the advantage of having the respective BCA fall within the same tolerance as currently specified in the DVD Specifications is that no hardware modification is needed for the present DVD player to be able to read the individualized codes encoded in the respective BCA area.

Figure 6:
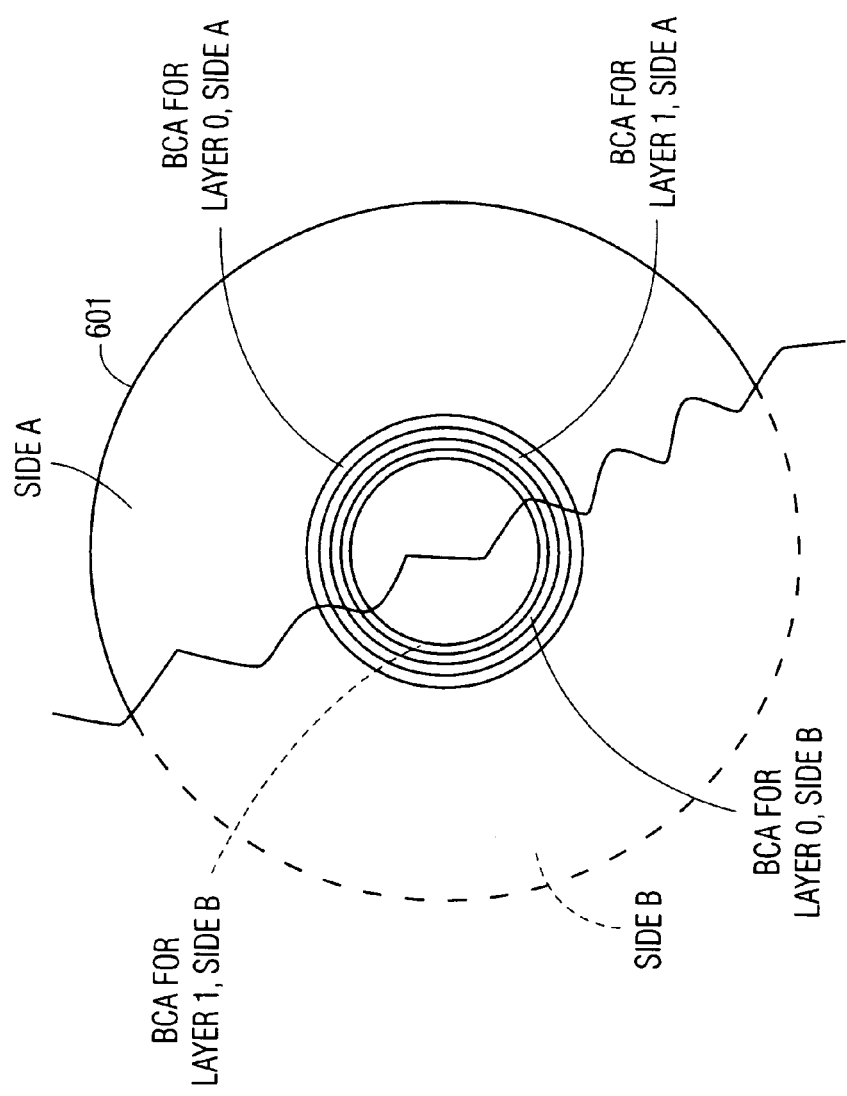
FIG. 6 shows an exemplary disk which has a burst cutting area for each layer of the 4-layer disk, with each burst cutting area occupying a non-overlapping, concentric circle on the disk in accordance with the present invention.

Another exemplary embodiment of a disk in accordance with the present invention is shown in FIG. 6. Again, the dual-sided, dual-layer disk shown in FIG. 6 has a BCA area for each layer of the disk. The BCA areas shown in FIG. 6 also have non-overlapping positions with respect to each other, thereby minimizing potential defects caused by the laser coding process. Each respective BCA for each layer of the disk in FIG. 6 occupies one of four successive concentric rings. The four concentric rings together form the area defined by the DVD Specifications for BCA (i.e., having inner circumference of 22.3 (+0/−0.4) mm and outer circumference of 23.50 (+/−0.05) mm from the center of the center hole). Since each BCA is still within the tolerance specified by the DVD Specifications, even though it is thinner, the red laser normally deployed in the DVD player will have no problem reading the codes embedded in each BCA, therefore, requiring little if any change to the current DVD hardware.

Figure 7:
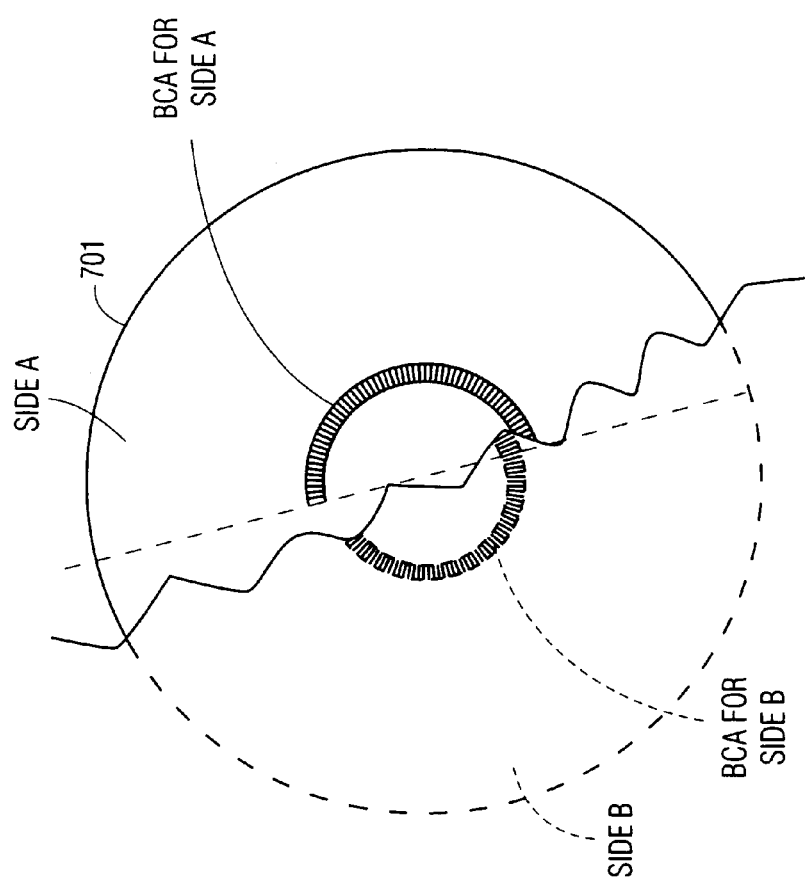
FIG. 7 shows an exemplary disk which has a burst cutting area for each side of a two-sided disk, with each burst cutting area occupying different, non-overlapping area of the disk.

FIG. 7 shows another exemplary embodiment of a disk employing a combination of the spatial separation arrangements shown in FIGS. 5 and 6. As shown in FIG. 7, a BCA for side A may be located in layer 1 of side A of the disk 701 and occupies a position which has non-overlapping circumferences and/or non-overlapping radius with respect to that of the BCA for side B of the disk 701. BCA for side B of the disk may also be located in layer 1 of the side B of disk 701.

Figure 8:
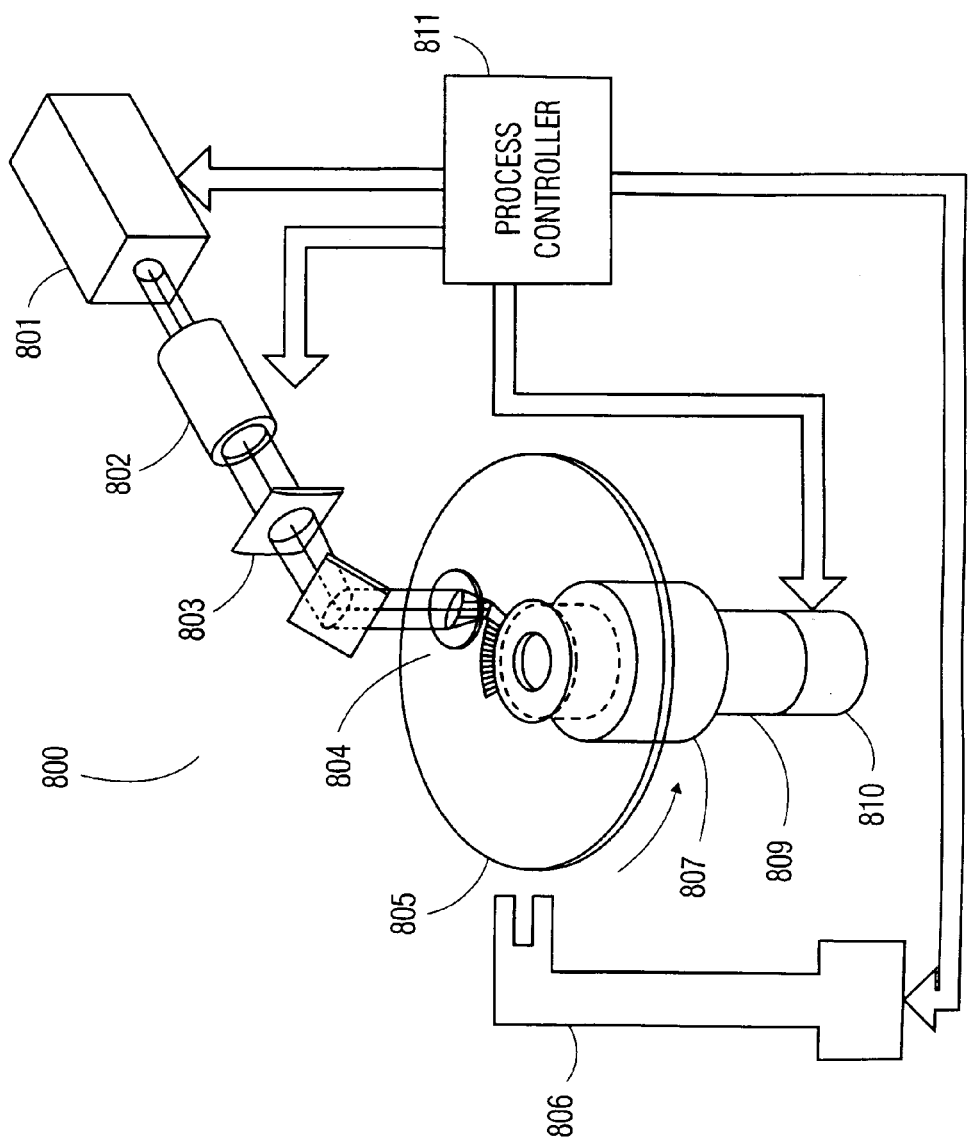
FIG. 8 shows an exemplary laser cutting apparatus capable of implementing the exemplary disks in accordance with the present invention.

FIG. 8 is an exemplary BCA recording system 800 suitable for encoding individualizable information in multiple configurations as shown, for example, in FIGS. 4–7. The system 800 utilizes a CW-Q switch type YAG laser source 801 with wavelength of 1.06 um. The laser source 801 applies a high energy pulse laser beam during a short period of time to remove an aluminum layer of a disk 805. One pulse of the laser beam can produce one BCA stripe.

The system 800 also includes a line beam forming optical system to shape the laser source into a line beam. The line beam forming system comprising a beam expander 802, cylindrical lens 803, focus lens 804. The functions of these components are well known in the art.

The system also includes a turn table 807 for seating a disk 805 to be encoded. The turn table 807 is controlled by a precision motor 809 which is connected to a rotary signal processor 810. Rotary signal processor 810 receives control signals from the processor controller 811 and in turns sends signals to drive the motor 809.

The system 800 is under the control of the process controller 811. The process controller 811 monitors the overall operation of the system and generates appropriate signals to control the laser source 801, rotary signal processor 810, the line beam forming system comprising of elements 801–803, and pick up arm 806, according to an exemplary control program shown in FIG. 9.

Figure 9:
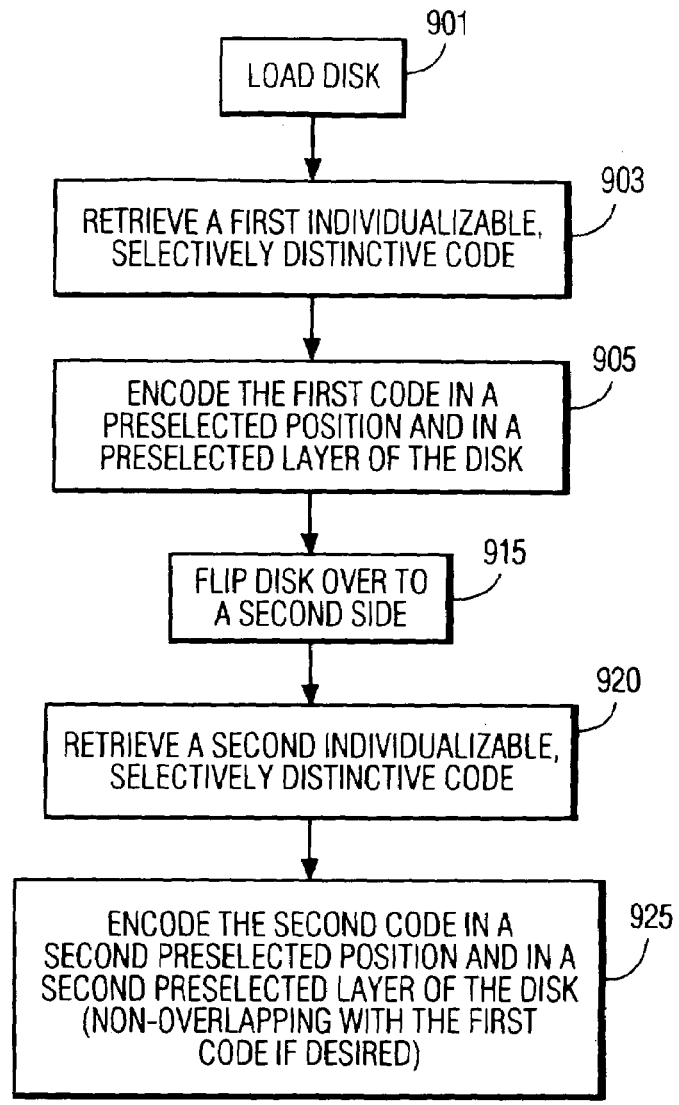
FIG. 9 shows an exemplary control program for controlling the apparatus shown in FIG. 8 in accordance with the present invention.

FIG. 9 shows an exemplary control program which may be executed by the processor controller 811 for controlling various components of the system 800 to encode BCA data on a disk in accordance with the present invention.

As shown in FIG. 9, at step 901, the pick up arm 806, under the control of the controller 811, will first load a disk 805 onto the turn table 807. At step 903, a first individualizable code such as a serial number is selected by the process controller 811. At step 905, the disk is then encoded with this selected code in a preselected position and in a preselected layer on the disk 805. The controller 811 will cause the beam forming system to focus the laser source 801 on the selected layer of disk incorporating the BCA. For example, the BCA may be located in layer 1 of a dual-layer disk, as specified in the DVD Specifications. As the BCA data is being written by the laser 801, the controller 811 generates the necessary signals to control the rotary signal processor 810 which then rotates motor 809 appropriately.

After finishing the encoding of the first BCA with the first code, the controller 811 will then instruct the pick up arm 806 to flip the disk over to the other side, at step 915. The controller 811 will then retrieve a second individualized code for use in the BCA for this side of the disk, at step 920. At step 925, controller 811 will then position the disk and/or the laser beam so that the second individualizable code will be cut in a preselected position on the this side of the disk. This preselected position may be overlapping as shown, for example, in FIG. 4, or non-overlapping as shown, for example, in FIGS. 5–7, with respect to the BCA for the other side of the disk. Encoding of the BCA for this side of the disk in a non-overlapping manner may be accomplished by either moving the motor 809 so that the laser source 801 is hitting the disk at a different rotational angle in relation to the first BCA on the other side of the disk, as shown, for example, in FIG. 5; or moving the focus lens 804 to a different radius from the center of the disk as shown, for example, in FIG. 6. Therefore, either overlapping or non-overlapping BCAs may be etched on the same disk in accordance with the present invention.

Figure 10:
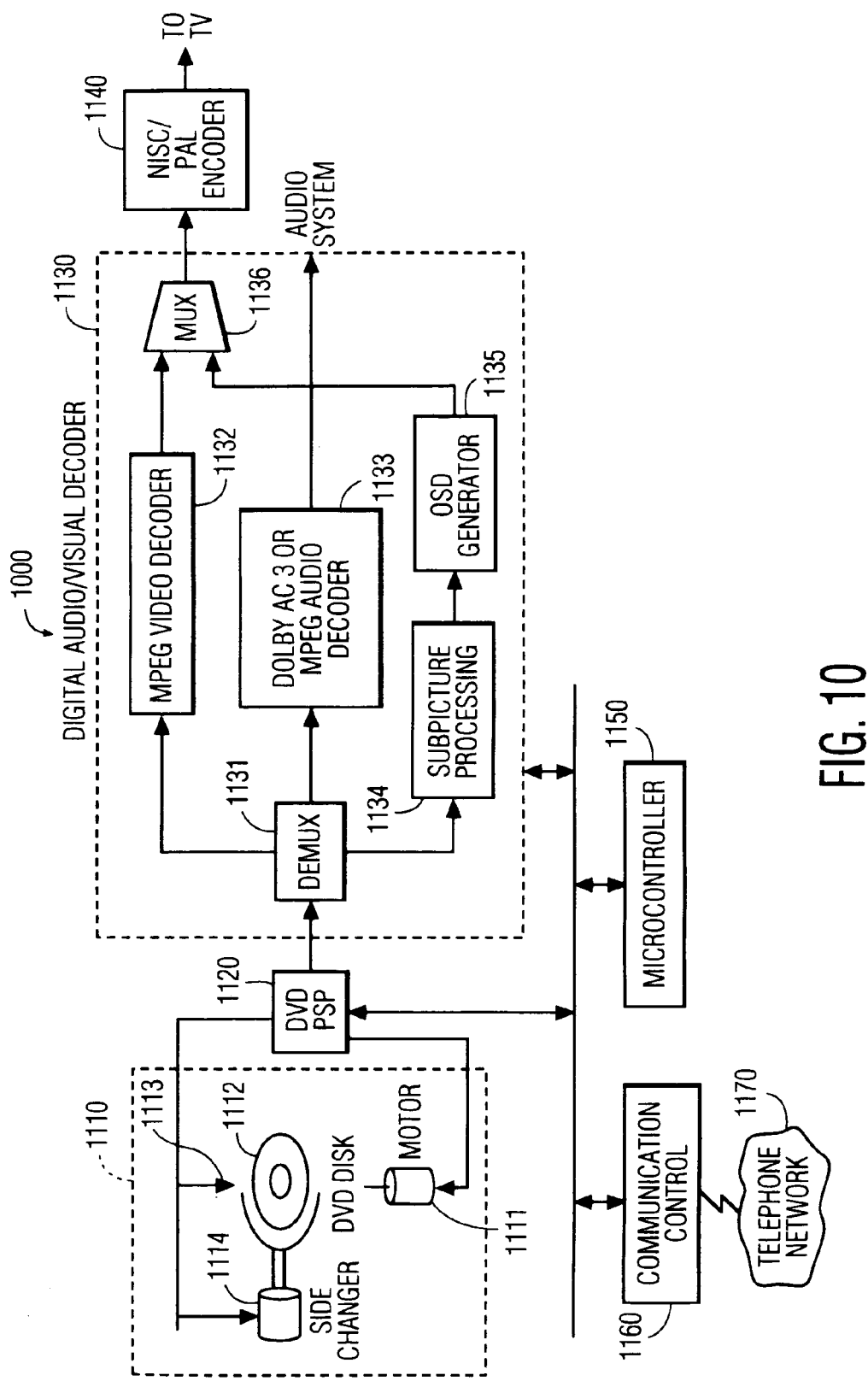
FIG. 10 shows an exemplary laser disc player which may be employed to play and process a dual-sided disc.

FIG. 10 is an exemplary laser disk player 1000 which may be employed to play and process a dual-sided disk having a burst cutting area on each side of the disk, or a multi-layered disk having a burst cutting area on selective layer of the disk, in accordance with the present invention. The exemplary laser disk player 1000 consists of the following major components.

Disk Reader Mechanism 1110 consists of a motor 1111 which spins a disk 1112, a laser source 1113 which reads information from the disk 1112, and an arm/side changer 1114 for flipping a disk so that the other side of a dual-sided disk can be read. As discussed above, other possible ways of having a player being able to read the other side of a disk include mechanically moving the laser source 1113 to the other side of the disk or manually flipping the disk by a user. The laser source 1113 is typically a red light laser diode with wavelength at 635 or 650 nm.

The DVD-DSP (Digital Signal Processor) 1120 is a circuit that translates laser reflections from a disk being read into electrical form so that other parts of the player 1000 can process the electrical information. The DVD-DSP 1120 also contains the necessary circuitries to monitor and control the subelements of the Disk Reader Mechanism 1110, including controlling the laser 1113, and the motor 1111, etc.

The electrical information from the DVD-DSP 1120 is transmitted to a Digital Audio/Video Decoder section 1130. The Digital Audio/Video Decoder 1130 is a circuit, which reconstructs the compressed data on the disk and converting them into studio-quality video and CD-quality audio for output to TVs and stereo systems.

In more detail, the Decoder 1130 consists of a Demultiplexer 1131 for demultiplexing the compressed data from the disk into three different data streams. A first data stream is a demuxed MPEG video stream which is transmitted to a MPEG Video Decoder 1132. A second data stream, a demuxed audio data stream, is fed into an appropriate type of audio decoder 1133 (such as a Dolby AC3 or an MPEG audio decoder). The third data stream is a demuxed subpicture data stream which is fed into the Subpicture Processing circuit 1134 and OSD Generator circuit 1135 for processing subpictures such as subtitles, captions, menus, etc., and for generating OSD and user menuing information.

The decoded and processed MPEG video and subpicture/OSD video data streams are then muxed together by Mutiplexer 1136. The combined video information is transmitted to an NTSC/PAL encoder 1140 so that the digital video information is converted into NTSC or PAL compatible analog format for displaying on an analog NTSC or PAL television (not shown).

A Microcontroller 1150 is provided to control the operation of the player 1000, including translating user inputs from a remote control (not shown) or a front panel (not shown) into commands for the various elements of the disk player 1000. The Microcontroller 1150 is also responsible for implementing functions such as controlling parental lockout, reading data from a respective laser-encoded area, and dialing a program provider for validating access codes, etc.

Communication Control 1160 is responsive to the Microcontroller 1150 for communicating information to/from a program provider, for example, for transmitting a serial number read from a BCA to a program provider for validation or billing purposes. The Communication Control 1160 typically includes a modem for communicating to the service provider through the telephone network 1170 via direct dialing or through an internet ISP provider.

Figure 11:
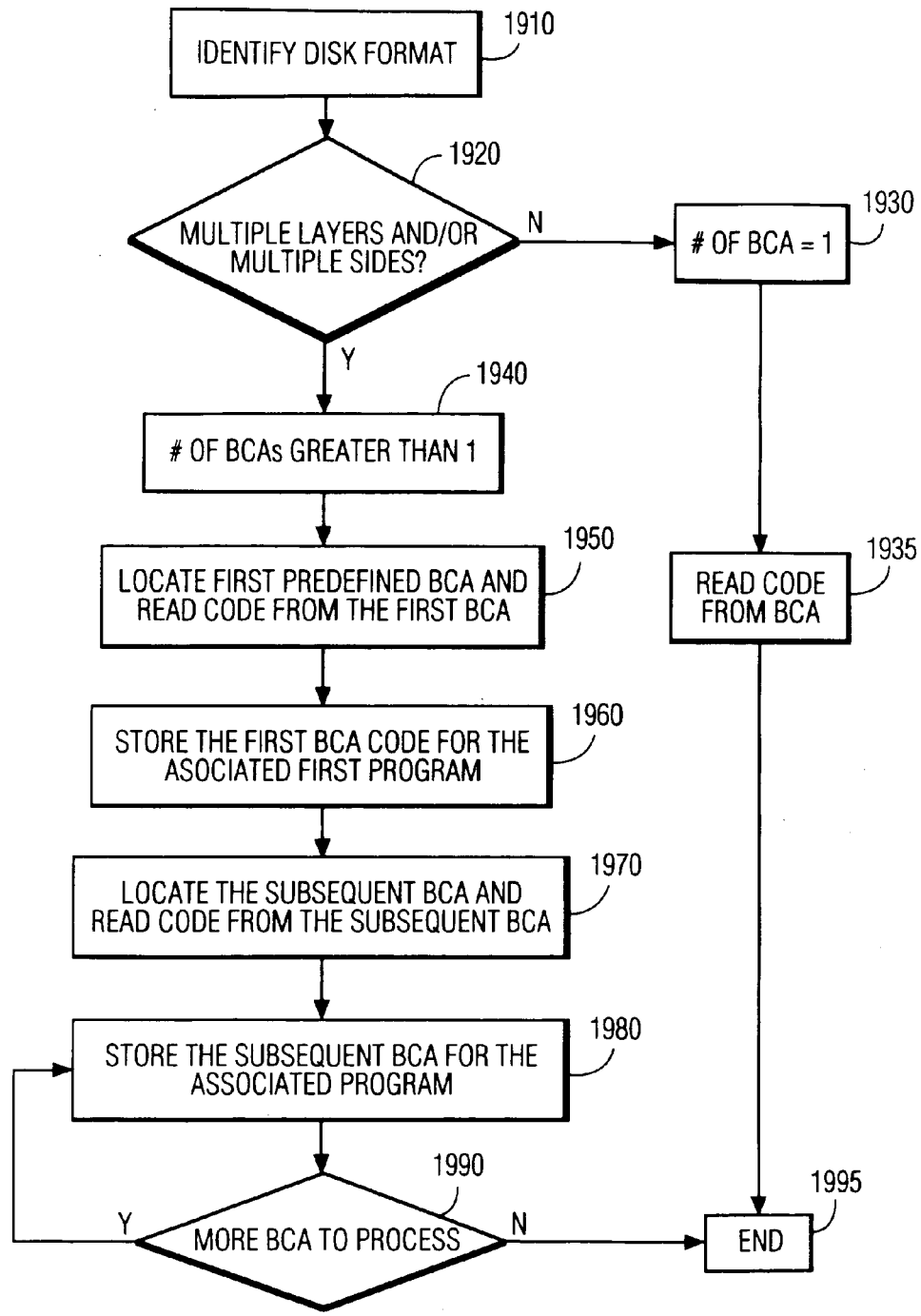
FIG. 11 shows an exemplary subroutine for reading codes from a respective laser encoded area.

FIG. 11 shows an exemplary subroutine for reading codes from a respective laser encoded area. This subroutine may be executed by the microcontroller 1150 of the exemplary laser disk player 1000 to identify and process different BCAs located on the same disk in accordance with the present invention. At step 1910, the lead-in area of a disk in the player 1000 is read by laser source 1113 and the information contained in the lead-in area is then processed by microcontroller 1150. The lead-in area of a disk includes data regarding the physical configuration of the disk. The information in the lead-in area currently include data about the number of layers on a disk, the disk size, and whether the disk contains a BCA, etc. If the player 1000 determines that this disk contains more than one layer of tracks, the player may assume that this disk contains more than one BCAs (e.g., one for each layer), as shown at steps 1920 and 1940. In addition, another exemplary embodiment may be that data in the lead-in area of the disk may specifically indicate the number of BCAs on the disk being processed, so that a player in response to this information will look for more than one BCAs at predefined locations.

If this lead-in area indicates that there is only one BCA on this disk either directly or indirectly, as shown at step 1930, the DVD player 1000 will then proceed to read this BCA as defined, for example, in the current DVD Specifications. Once this BCA is read, the player 1000 will end this subroutine for reading the BCA code, at step 1995.

If the player 1000 determines that more than one BCAs are on this disk, it will first identify the number of BCAs on the disk. The player 1000 will then locate a first predefined BCA code and read the code contained in the first BCA, as shown at step 1950. For example, if the disk is in a format shown in FIG. 5, the DVD will first focus the laser source 1113 on layer 1 to read BCA data on layer 1. The DVD player 1000 will then store this BCA in memory as well as an indication of which program this BCA code is associated with (e.g., an indication that this first BCA code is for the first layer of side A of the disk), as shown at step 1960. The DVD player will then attempt to locate a subsequent BCA and read code from the subsequent BCA, at step 1970. For example, the DVD player 1000 will then cause the laser source 1113 to focus the laser on layer 0 of side A of the disk. It will then store this subsequent BCA code for the program in layer 0 of side A of the disk, at step 1980. The player will then repeat the process until all the BCAs on the disk are processed and read, as shown at step 1990, including turning the disk over to read BCA data from the other side of the disk.

It is to be understood that the embodiments and variations shown and described herein are for illustration only and that various modifications may be implemented by those skilled in the art without departing from the scope and spirit of the invention.

What is claimed is:

1. A recording medium having a first and a second side comprising:
   respective program data on said first and said second sides of said medium; and
   a first area on said first side and a second area on said second side of said medium, each said area having disposed thereon distinctive laser encoded data representing information identifying said respective program data, said first area and said second area being disposed between the center of the recording medium and an outer circumference, said respective program data being disposed outside the outer circumference, and said first area and said second area occupying non-overlapping positions with respect to each other, wherein said first and second areas are burst cutting areas.

2. The medium of claim 1 wherein said first area has substantially the same inner and outer circumferences but a different angular position from said second area.

3. The medium of claim 1 wherein said first and second areas are positioned as concentric rings with respect to each other.

4. The medium of claim 1 wherein said medium is a DVD disk.

5. A recording medium comprising:
a first layer and a second layer, each of said layers containing respective program data;
a first area on said first layer and a second area on said second layer, each said area having disposed thereon distinctive laser encoded data representing individualized information, said first area and said second area being disposed between the center of the recording medium and an outer circumference, said respective program data being disposed outside the outer circumference, and said first area and said second area occupying non-overlapping positions with respect to each other, wherein said first and second areas are burst cutting areas.

6. The medium of claim 5 wherein said first area has substantially the same inner and outer circumferences but a different angular position from said second area.

7. The medium of claim 5 wherein said first and second areas are positioned as concentric rings with respect to each other.

8. The medium of claim 5 wherein said medium is a DVD disk.

9. The medium of claim 5 wherein said first and second layers are on the same side of said medium.

10. An apparatus for laser encoding a first and a second selectively distinctive codes on a recording medium, comprising:
means for encoding a first individualized code in a first predetermined position and in a first preselected layer on said recording medium, said first individualized code being associated with first program data; and
means for encoding a second individualized code in a second preselected position and in a second preselected layer of said recording medium, said second individualized code being associated with second program data, said first area and said second area being disposed between the center of the recording medium and an outer circumference, said first and second program data being disposed outside the outer circumference, and said first area and said second area occupying non-overlapping positions with respect to each other, wherein said first and second areas are burst cutting areas.

11. A method for processing a disk having a plurality of programs on said disk, comprising the steps of:
identifying a count representing the number of laser encoded areas on said disk, each one of said plurality of programs on said disk being uniquely associated with particular one of the laser encoded areas;
obtaining a first laser encoded data by reading from a first laser encoded area on said disk; and
obtaining a subsequent laser encoded data by reading from a subsequent laser encoded area on said disk until the number of laser encoded areas read equals to said count.

12. The method of claim 11, wherein said laser encoding areas are burst cutting areas for a DVD disk.

13. A optical disk having a first recording area where first main data are recorded in the form of pits, and a second recording area which is a predetermined area in the first recording area, where a plurality of a reflection film are removed partially, so a first identification data is recorded for associating with the first main data, the optical disk being characterized by:
a third recording area for recording second main data; and
a fourth recording area where a plurality of reflection film are removed partially, so a second identification data, which is distinctive with respect to the first identification data, is recorded for associating with the second main data, said second recording area and said fourth recording area being disposed between the center of the recording medium and an outer circumference, said first recording area and said third recording area being disposed outside the outer circumference, and said second recording area and said fourth recording area occupying non-overlapping positions with respect to each other, wherein said first and second recording areas are burst cutting areas.

14. A method for processing a disk, comprising the steps of:
obtaining, from the disk, a first individualized code disposed on a first area of the disk;
using the first individualized code obtained to process first data associated with the first code;
obtaining, from the disk, a second individualized code, which is distinctive with respect to the first individualized code, disposed on a second area of the disk; and
using the second individualized code obtained to process second data associated with the second individualized code, said first area and said second area being disposed between the center of the recording medium and an outer circumference, said first and second data being disposed outside the outer circumference, and said first area and said second area occupying non-overlapping positions with respect to each other, wherein said first and second areas are burst cutting areas.

15. A method for forming a disk, comprising the steps of:
encoding first main data on a first area of the disk; and
encoding a first individualized code on a second area of the disk for identifying the first main data;
encoding second main data on a third area of the disk; and
first individualized code, on a fourth area of the disk for identifying the second main data, said second area and said fourth area being disposed between the center of the recording medium and an outer circumference, said first area and said third area being disposed outside the outer circumference, and said second area and said fourth area occupying non-overlapping positions with respect to each other, wherein said first and second areas are burst cutting areas.

\* \* \* \* \*